July 13, 1954     H. N. SHOIKET ET AL     2,683,780
ACCELERATION SENSING SWITCH

Filed May 17, 1952     2 Sheets-Sheet 1

INVENTORS.
HENRY N. SHOIKET
EDWARD B. KINNAMAN
WILLIAM D. TROTTER
BY Roy Matterns
ATTORNEY July 13, 1954

H. N. SHOIKET ET AL 2,683,780

ACCELERATION SENSING SWITCH

Filed May 17, 1952

INVENTOR.
HENRY N. SHOIKET
EDWARD B. KINNAMAN
WILLIAM D TROTTER
BY Roy Mattern Jr.
ATTORNEY Patented July 13, 1954

2,683,780

UNITED STATES PATENT OFFICE 2,683,780

ACCELERATION SENSING SWITCH

Henry N. Shoiket, Brooklyn, N. Y., and Edward Berkeley Kinnaman and William D. Trotter, Seattle, Wash., assignors to Boeing Airplane Company, Seattle, Wash., a corporation of Delaware Application May 17, 1952, Serial No. 288,506

3 Claims. (Cl. 200—61.45)

This invention relates to acceleration sensing switches which close when vibratory or other accelerations exceed a predetermined value.

The invention comprises a housing containing a spring biased weight which bears against a spring loaded contact member until vibratory or other movement of the weight free the contact member to permanently close the switch.

The purpose of the invention is to provide an acceleration sensing switch responsive to vibratory or other accelerations above a predetermined magnitude, occurring in a defined reference plane.

It is an object of the invention to provide an acceleration sensing switch for mounting on a movable mass that is subject to acceleration to automatically actuate controls terminating the motive forces.

It is an object of the invention to provide an acceleration sensing switch for mounting on a propulsive engine to automatically actuate electrical controls shutting down the engine when it becomes unbalanced.

It is an object of the invention to provide a compact, reliable acceleration sensing switch which can be readily manufactured and installed.

The purpose and objects of the invention will be apparent from the following description written with reference to the accompanying drawings, in which.

Figure 1:
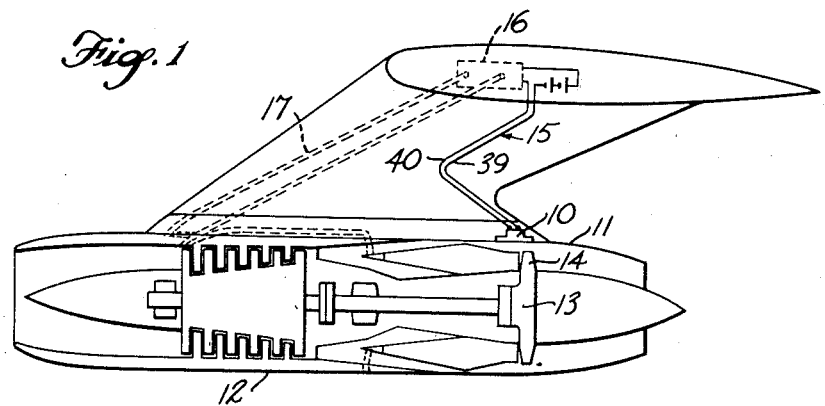
Figure 1 is a schematic sectional view of a turbo-jet engine mounted below a wing showing the placement of the acceleration sensing switch on the engine.

Referring to Figure 1, the inventive switch means 10 is mounted on the structure 11 of a turbo-jet engine 12 adjacent to the turbine rotor 13 or at some similar location, responsive to excessive radial acceleration caused by unbalanced conditions created upon the loss of turbine blades 14, thereby energizing a relay in an electrical circuit 15 to operate a motor driven valve 16 stopping the flow of fuel to the engine 12 through the fuel supply line 17.

Figure 2:
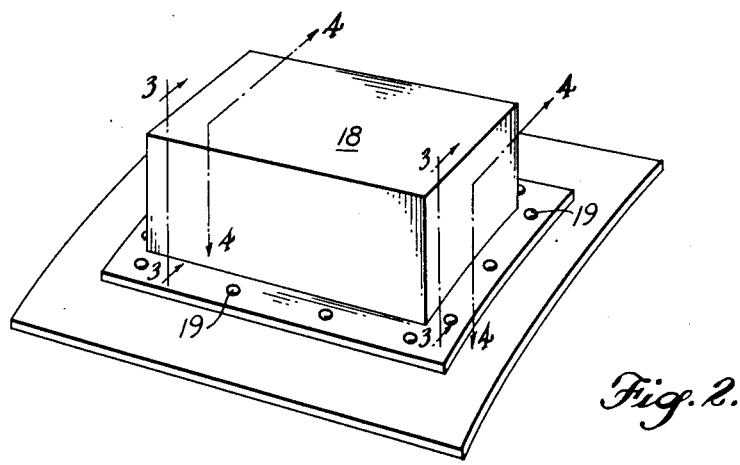
Figure 2 is a perspective view of the exterior of the acceleration sensing switch mounted on a section of the engine structure.

The switch means 10 of the preferred embodiment, is contained within a housing 18 which is secured to the structure 11 by the fasteners 19, as noted in Figure 2.

Figure 4:
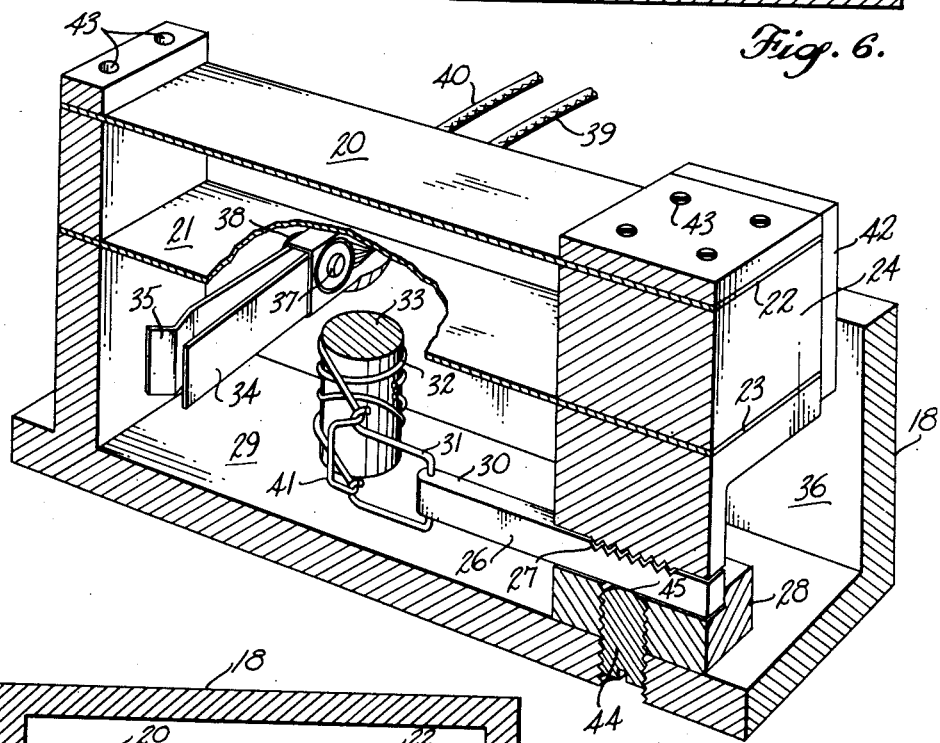
Figure 4 is a sectional-perspective view of the acceleration sensing switch of Figure 2 taken on the broken surface planes 4—4.
Figure 3:
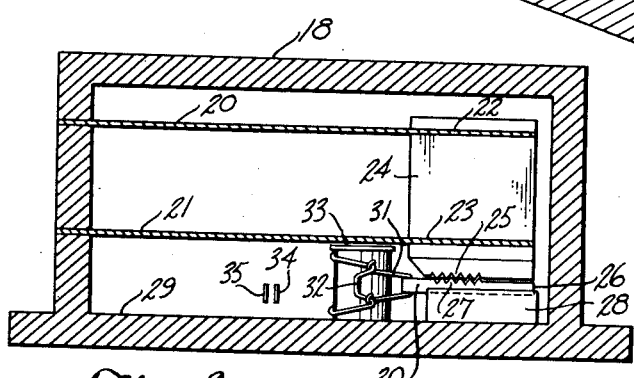
Figure 3 is a sectional view of the acceleration sensing switch of Figure 2 taken at 3—3.

The arrangement of the interior of the housing 18 is illustrated in Figures 3 and 4. Two flat, non-intersecting, preloaded springs 20, 21, extend outward from one side of the housing 18, their extending ends 22, 23 supporting a weight 24. Immediately below the serrated portion 25 on the bottom of the weight 24, is a slidable member 26, with complementary serrations 27, supported by a guide 28 secured to the base 29 of the housing 18.

The slider 26 on its extending end 30 has a U-shaped wire hook 31 which interfits with the extending closed tapered hooked end 41 of the wire spring 32 wrapped around and secured to an anchoring device 33 attached to the base 29 of the housing 18. Beyond the anchor 33 and located in the path followed by the spring end 41 when it is released, are open electrical contacts 34, 35, extending out from the back 36 of the housing 18 where electrical terminals 37, 38 are installed to receive the leads 39, 40 of the motor-driven valve circuit 15.

A hole is drilled and tapped in the base 29 and through the guide 28 to accommodate a set-screw 44 which is self-locking in any position. The set-screw 44 has a spherical end 45 which contacts the underside of the member 26 permitting slight corrections in its position on the guide 28 thereby insuring alignment of the complementary serrations 25 and 27.

The respective switch members remain in the positions illustrated in Figures 3 and 4 and as described above until the critical acceleration of the weight 24 and the preloaded springs 20, 21 is obtained, causing the weight to move free of the slider 26. The spring 32 is then free to move and the movement commenced does not terminate until the end 41 of the spring 32 strikes the contact 34 forcing and holding it against the complementary contact 35 closing the circuit 15, thereby energizing the actuating relays of the motors operating the valves 16.

In this manner the switch initiates a progression of functions cutting off the fuel supply to an engine which has become unbalanced due to the loss of some of its turbine blades or segments thereof, or by bearing failure.

The switch can be calibrated conveniently within limits to operate upon reaching a predetermined acceleration by the addition or removal of additive weights 42 located on the sides of the weight 24. The preloaded flat spring members 20, 21 are replaced readily by removing the fastening screws 43 and their replacement serves as another means of calibration for the new springs may have varying resilient characteristics.

Care must be exercised in the design of the switch to make sure that accelerations, vibratory or otherwise, below the minimum predetermined value do not trip the switch, and that resonant frequencies of the component parts of the switch do not occur within the normal operating range of frequencies of the equipment on which the switch is mounted.

Figure 5:
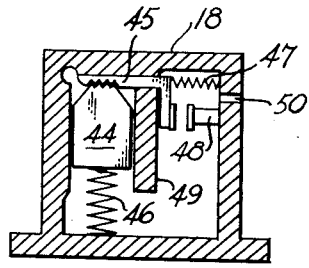
Figure 5 is a sectional view of an embodiment of the invention.
Figure 6:
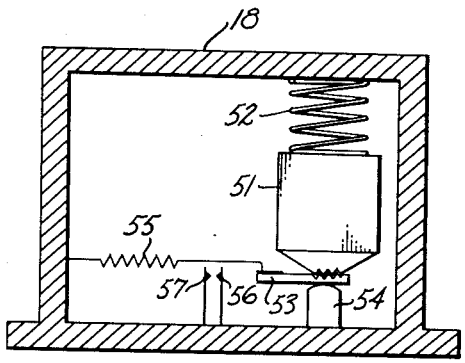
Figure 6 is a sectional view of another embodiment of the invention.

Figures 5 and 6 show embodiments of the invention wherein the same cooperation of elements is involved, but their arrangement within the housing 18 is modified.

The embodiment of Figure 5 utilizes a weight 44 which is biased upward against a slider-contact 45 by a coiled spring 46. A spring 47 pulls the slider-contact 45 into an abutting relationship with the contact 48 when the weight 44 vibrates with sufficient acceleration releasing the slider 45. Other features include a guide 49 to insure that the weight 44 will be only responsive to vibrations in a radial plane and an access hole 50 to accommodate a tool (not shown) for manually resetting the slider-contact 45.

The embodiment of Figure 6 comprises a weight 51 attached to a compressed coil spring 52 and biased against a slider 53 supported by the rest 54. When the unbalanced condition of the engine 12 causes the weight 51 to vibrate with sufficient magnitude, the slider 53 is withdrawn from beneath the weight 51 by the spring 55 closing the contacts 56, 57.

These embodiments can be manufactured, assembled and installed very readily to serve their important function of automatically actuating relays that indirectly shut down an engine which has become unbalanced due to the loss of turbine blades or segments thereof.

Having now particularly described and ascertained the nature of my invention, and in what manner the same is to be performed, I declare that what I claim is:

1. An automatic switch to actuate an electrical circuit when vibrations exceeding a given magnitude are transmitted to the switch, comprising a housing with mounting flanges, a weight resiliently supported within the said housing, preloaded springs controlling the movement of the said weight, a spring operated plunger held in a retracted position by the said weight and said preloaded spring, the plunger-spring attached to the said housing and hooked under tension to the said plunger, and spaced electrical contacts mounted in the housing within the striking movement of the said plunger-spring when it is freed as the said plunger is released by the said weight undergoing vibration of a predetermined magnitude.

2. An automatic switch to actuate an electrical circuit when vibrations exceeding a given magnitude are transmitted to the switch, comprising a housing, a mass resiliently supported within the housing, preloaded leaf springs supporting the mass and controlling its movement, a spring operated plunger held in a retracted position by the mass and preloaded spring, the plunger-spring attached to the housing and hooked under tension to the said plunger, and spaced electrical contacts mounted in the housing within the striking movement of the said plunger-spring when it is freed as the said plunger is released by the said weight undergoing vibration of a predetermined magnitude.

3. An automatic switch to actuate an electrical circuit when vibrations exceeding a given magnitude are transmitted to the switch, comprising a housing, a weight within the said housing, preloaded springs supporting the weight and controlling its movement, a spring operated plunger held in a retracted position by the mass and preloaded spring, the plunger-spring attached to the housing and hooked under tension to the said plunger, and spaced electrical contacts mounted in the housing within the striking movement of the said plunger-spring when it is freed as the said plunger is released by the said weight undergoing vibration of a predetermined magnitude.

References Cited in the file of this patent

UNITED STATES PATENTS

| Number | Name | Date |
|---|---|---|
| 915,246 | Stratton | Mar. 16, 1909 |
| 1,535,240 | Morris | Apr. 28, 1925 |
| 1,626,921 | Douglas | May 3, 1927 |
| 2,188,144 | Eytman | Jan. 23, 1940 |
| 2,488,739 | Printz | Nov. 22, 1949 |
| 2,551,752 | Mathisen | May 8, 1951 |
| 2,581,078 | Corfield | Jan. 1, 1952 |
| 2,585,749 | Lorenzo | Feb. 12, 1952 |